(12) United States Patent
Mirmiran et al.

(10) Patent No.: US 10,138,632 B2
(45) Date of Patent: Nov. 27, 2018

(54) WIND RESISTANT CONCRETE ROOF COMPONENT AND SYSTEM AND METHOD FOR FORMING SAME

(71) Applicant: THE FLORIDA INTERNATIONAL UNIVERSITY BOARD OF TRUSTEES, Miami, FL (US)

(72) Inventors: Amir Mirmiran, Weston, FL (US); Arindam Gan Chowdhury, Miami, FL (US); Nakin Suksawang, Doral, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 15/225,161

(22) Filed: Aug. 1, 2016

(65) Prior Publication Data
US 2016/0340904 A1    Nov. 24, 2016

Related U.S. Application Data

(63) Continuation of application No. 14/133,009, filed on Dec. 18, 2013, now Pat. No. 9,428,911.
(Continued)

(51) Int. Cl.
*E04D 3/26* (2006.01)
*E04D 3/04* (2006.01)
(Continued)

(52) U.S. Cl.
CPC .................. *E04D 3/26* (2013.01); *E04B 7/22* (2013.01); *E04D 3/04* (2013.01); *E04D 3/32* (2013.01);
(Continued)

(58) Field of Classification Search
CPC .. E04D 3/04; E04D 3/35; E04D 3/351; E04D 3/26; E04D 3/32; E04D 3/34; E04F 13/075; E04B 7/20; E04B 7/22
(Continued)

(56) References Cited

U.S. PATENT DOCUMENTS 1,427,968 A * 9/1922 Pedersen ................... E04D 1/04
52/533
1,455,657 A * 5/1923 Pontello ..................... E04B 5/04
138/115
(Continued)

*Primary Examiner* — Brian E Glessner
*Assistant Examiner* — Adam G Barlow
(74) *Attorney, Agent, or Firm* — Marshall, Gerstein & Borun LLP

(57) ABSTRACT

A roof system includes a roof panel formed of concrete and an architectural surface such as a corrugated surface. A first layer of reinforcing material is disposed along and spaced inwardly from a first surface of the roof panel, and an optional second layer of reinforcing material is disposed along and spaced inwardly from a second surface of the roof panel. The first layer of reinforcing material is spaced from the second layer of reinforcing material. The reinforcing material may be formed of fiber-reinforced polymer mesh, made with carbon fibers or glass fibers. FRP rebar may be used in conjunction with FRP mesh to provide added structural strength. The roof panel may include one or more elongated ribs having a thickness greater than adjacent portions of the roof panel. In other aspects, concrete structures with reinforcing material may be used for either roof panels or wall applications.

17 Claims, 7 Drawing Sheets

Related U.S. Application Data

(60) Provisional application No. 61/738,918, filed on Dec. 18, 2012.

(51) Int. Cl.
  *E04B 7/22* (2006.01)
  *E04D 3/35* (2006.01)
  *H02S 20/25* (2014.01)
  *E04D 3/32* (2006.01)
  *E04D 3/34* (2006.01)

(52) U.S. Cl.
  CPC ............ *E04D 3/34* (2013.01); *E04D 3/35* (2013.01); *H02S 20/25* (2014.12); *E04D 3/351* (2013.01); *Y02B 10/12* (2013.01)

(58) Field of Classification Search
  USPC .................................................... 52/408, 409
  See application file for complete search history.

(56) References Cited

U.S. PATENT DOCUMENTS

| | | | | |
|---|---|---|---|---|
| 2,335,208 A | * | 11/1943 | Harrap | E04D 3/35 428/184 |
| 3,870,546 A | * | 3/1975 | Gelsomino | C04B 41/009 206/451 |
| 4,159,361 A | * | 6/1979 | Schupack | B28B 19/0092 442/63 |
| 4,233,786 A | * | 11/1980 | Hildreth | E04D 13/1585 52/556 |
| 4,251,967 A | * | 2/1981 | Hoofe, III | E04D 3/32 52/527 |
| 4,567,084 A | * | 1/1986 | Juei Jse | E04D 3/35 106/286.6 |
| 4,651,494 A | * | 3/1987 | Van Wagoner | E04D 3/352 428/314.8 |
| 6,119,422 A | * | 9/2000 | Clear | E04C 2/26 52/268 |
| 6,233,892 B1 | * | 5/2001 | Tylman | E04B 7/22 52/309.12 |
| 7,003,922 B2 | * | 2/2006 | Fifield | E04D 3/04 52/302.1 |
| D568,497 S | * | 5/2008 | Burman | D25/141 |
| 2001/0047631 A1 | * | 12/2001 | Nolan | E01F 8/0023 52/378 |
| 2008/0127587 A1 | * | 6/2008 | McIntire | E04D 1/08 52/309.12 |
| 2010/0269440 A1 | * | 10/2010 | Torres | E04D 1/08 52/309.4 |

\* cited by examiner

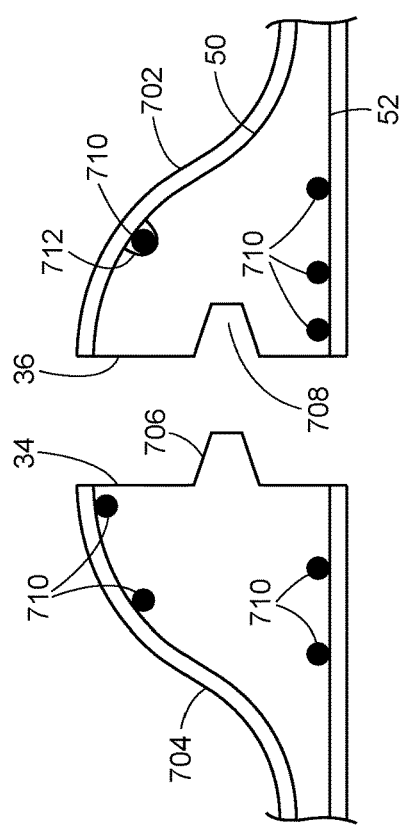
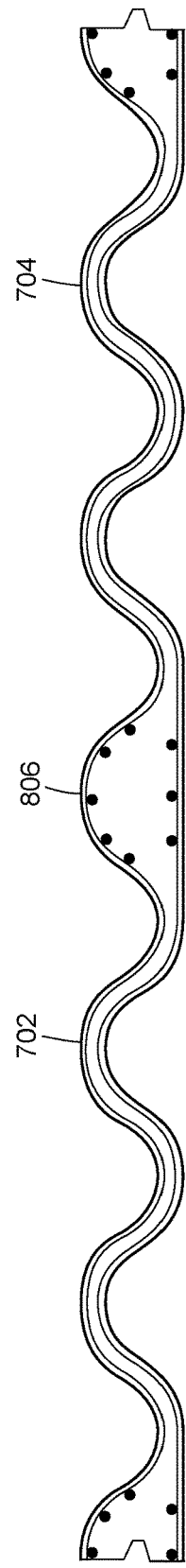
FIG. 7
FIG. 8

WIND RESISTANT CONCRETE ROOF COMPONENT AND SYSTEM AND METHOD FOR FORMING SAME

RELATED APPLICATIONS

This application is a continuation application of U.S. patent application Ser. No. 14/133,009, filed Dec. 18, 2013, which claims priority benefit of provisional application No. 61/738,918, filed Dec. 18, 2012, the entirety of U.S. patent application Ser. Nos. 14/133,009 and 61/738,918 are hereby incorporated by reference herein.

FIELD OF THE INVENTION

The present invention relates generally to a roof component such as a roof panel and a roof system including one or more of the roof panels, and a method of forming same.

DESCRIPTION OF THE BACKGROUND

A high growth in hurricane-induced losses in recent years is a significant concern for coastal communities. Low-rise buildings, including residential structures, institutional structures, and commercial structures, are believed to be a dominant building type in the United States and also seem to be among the most vulnerable under high winds, such as those occur during hurricanes, tropical storms, etc. Recent post-disaster surveys have provided direct evidence that hurricane-induced damage and property losses are caused in large part due to failure of roofs and subsequent intrusion of water into a building.

Wind damage to buildings principally manifests in breach of the roof envelope and/or the wall envelope, and consequent damage to the building contents. Hence, the vulnerability of buildings to high winds is a function of the loading and the strength of building envelope components and their connections. Also, for a given building impacted by winds of a given intensity, the resulting damage is largely dependent upon the nature of its immediate environment and the architectural design of the building.

Extreme wind events are responsible for significant property damage and loss of life due to compromised residential homes. Hurricanes, for example, create massive destruction, and the damage from the wind pressure, wind borne debris, storm surge, and flooding cause high losses over a short period of time. Coastal areas in the United States along the Atlantic and Pacific Oceans and the Gulf of Mexico are particularly susceptible to this type of damage. Other extreme wind events may include tornados, high straight line wind storms, and typhoons, along with katabatic winds, such as the Santa Ana winds in California.

If the building envelope is compromised, the whole structure is put in jeopardy, because internal pressure results. While wind pressure creates high forces, especially near the edges of the structure, wind borne debris can also compromise the structure. The roof system of the building is particularly of interest because the construction methods create a component of the overall structure that is a potentially weaker point.

For example, damage investigation following Hurricane Andrew in 1992 and other more recent events found that many building structures were not destroyed because of the external wind-pressure load alone. Flying debris frequently breached the windward elements of the building envelopes and subjected the building interior to intense fluctuations of positive pressure. However, fluctuating negative pressure on exterior surfaces, in combination with the positive internal pressure, results in significantly larger forces on some components of the building envelope than would be caused by external pressure alone. Therefore, the likelihood of simultaneous occurrence of a positive internal pressure and a negative external pressure peak is of major importance in building design considerations.

Historically, damage to roof coverings and rooftop equipment is the leading cause of building performance problems during hurricanes. Rains accompanying a hurricane can cause water to enter buildings through damaged roofs, resulting in major damage to the contents and interior. For example, unless quick action is taken to dry a building, mold bloom can quickly occur in the hot, humid Florida climate. Drying of buildings was hampered after Hurricane Charley in 2004 by the lack of electrical power to run fans and dehumidifiers. These damages frequently are more costly than the roof damages themselves. Water leakage can also disrupt the functioning of critical and essential facilities and weaken ceilings and cause them to collapse. Further, ceiling collapse can cause injury to occupants.

SUMMARY

A roof panel may include a panel formed of concrete having an elongated profile with a top surface and a bottom surface. The top surface may include a series of alternating ridges and valleys extending between the first and second edges and defining a corrugated surface. A first layer of reinforcing material may be disposed along, and spaced inwardly from, a first surface of the roof panel, and an optional second layer of reinforcing material may be disposed along, and spaced inwardly from, a second surface of the roof panel. The first layer of reinforcing material may be spaced from the second layer of reinforcing material. The reinforcing material in some aspects may be formed of fiber-reinforced polymer (FRP) mesh, made with carbon fibers or glass fibers, for example. The roof panel may include one or more elongated ribs having a thickness greater than adjacent portions of the roof panel.

According to another aspect, a roof system may include a roof panel that is supported by first and second support members at opposite ends of the roof panel. The roof panel may be secured to the support members by fasteners arranged for connection together after the roof panel is fully formed.

According to a further aspect, a method of forming a roof system for a building may include forming the roof panel separate from the support members, transporting the roof panel to the support members after forming, and securing the roof panel to the support members with fasteners.

In still a further aspect, a method of forming a roof system for a building may include forming the roof panel in-situ at the building site.

Other aspects and advantages will become apparent upon consideration of the following detailed description.

BRIEF DESCRIPTION OF THE DRAWINGS

FIG. 7 is a cross-sectional view of another embodiment of end portions of two roof panels.

FIG. 8 illustrates the roof panels of FIG. 7 connected with one another.

DETAILED DESCRIPTION

Figure 1:
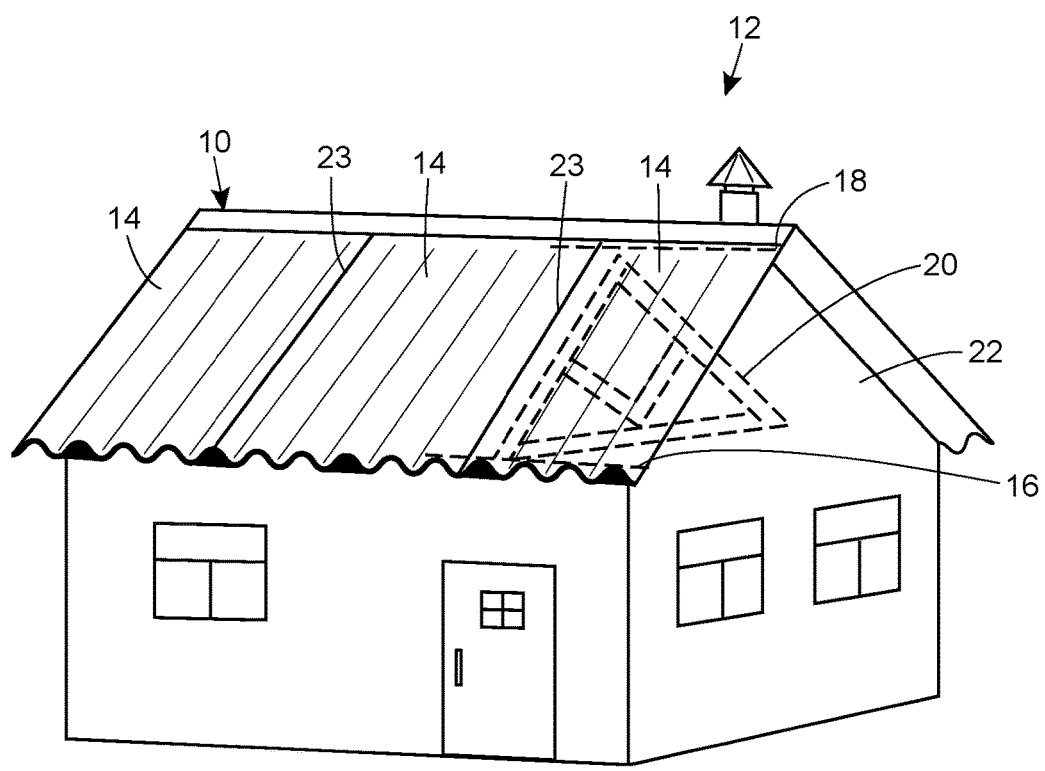
FIG. 1 is a schematic view of a building including a roof system according to some aspects of the present disclosure.

Turning now to the drawings, FIG. 1 illustrates a roof system 10 constructed according to principles of the present disclosure and incorporated in a structure, such as building 12, to provide protection of an interior of the building from external elements, such as wind, rain, heat, cold, dirt, and debris. The roof system 10 comprises one or more roof panels 14 formed of concrete according to principles of the present disclosure, which, in some arrangements, may provide improved resistance to failure under high wind loads, such as during hurricanes, over roof systems currently commonly used for buildings, such as single family residences.

The roof panels 14 are coupled together at joints 23. The roof panels 14 are supported by a first support 16, such as a load bearing wall, beam, or lintel, and a second support 18, such as a support beam, ridge beam, girder, or lintel. Preferably, each of the supports 16, 18 provides a plurality of support points for each roof panel 14 where the panel is directly supported by the support point, either with or without an intermediate structure, such as an intermediate layer of caulk or a bearing plate or the like, disposed there between. In a some preferred arrangements, each support 16, 18 provides a linear or curvilinear support surface across an entire width or length of the roof panel 14, such as the top of the load bearing wall 16, a lintel, a roof truss, beam, girder, etc. In other arrangements, one or more of the supports 16, 18 may provide a plurality of spaced apart support surfaces that do not span the entire width or length of the roof panel 14, such as spaced apart bearing pads or columns.

The roof system 14 may optionally include one or more roof trusses 20 and/or gables 22 as in standard A-frame residential home construction. However one possible benefit of the roof panel 14 is the versatility to provide roof systems in a pitched roof or sloped roof without the use of supporting roof trusses such as trusses 20 extending between the wall and the ridge beam given that the roof panels themselves provide structural support as will be explained further below.

Figure 2:
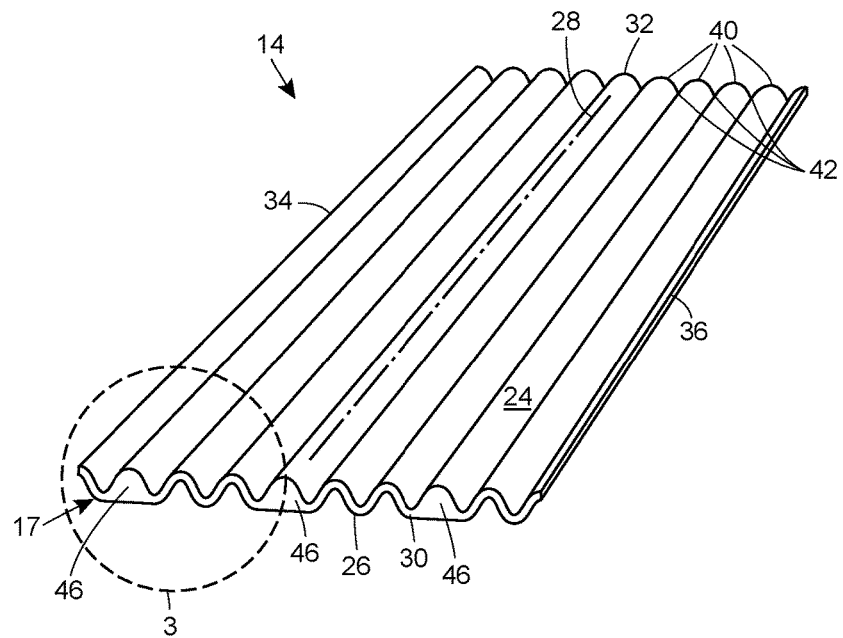
FIG. 2 is an isometric view of a roof panel usable in the roof system of FIG. 1.

FIG. 2 depicts one exemplary roof panel 14. The roof panel 14 is in the shape of a generally planar panel formed of concrete having top surface 24 and a bottom surface or second surface 26, each of the top and bottom surfaces 24, 26 having a length and a width, wherein the length extends along a longitudinal axis 28 from a first axial end 30 to a second axial end 32, and the width extends laterally to the longitudinal axis from a first lateral edge 34 to a second lateral edge 36. The term "generally planar" is used to mean that the large-scale shape of the panel is planar, although as described below, the surface may have various non-planar features or architectural features, such as ribs, corrugated ridges and valleys, and/or other surface features that are relatively small in relation to the overall outer peripheral dimensions of the panel. However, the roof panel 14 is not limited to generally planar arrangements and may be curved or angled as may be needed for different applications or designs.

In one embodiment, the roof panel 14 has an elongated cross-sectional profile 17, which extends from the first axial end 30 to the second axial end 32. A first exemplary profile section 3 is illustrated in detail in FIG. 3. The top or first surface 24 of the roof panel 14 extends from the first lateral edge 34 to the second lateral edge 36 and has an undulating surface, such as a corrugated surface formed by a plurality of alternating and axially aligned elongated ridges 40 and valleys 42. In another embodiment, the ridges 40 can be more triangular in shape or other geometric shape as compared to that shown in FIG. 2. The ridges 40 and valleys 42 alternate laterally from the first lateral edge 34 to the second lateral edge 36, whereby, other than at the lateral edges 34 and 36, each valley 42 is disposed between and adjacent to two ridges 40, and each ridge 40 is disposed between and adjacent to two valleys 42. The alternating ridges 40 and valleys 42 preferably extend completely from the first lateral edge 34 to the second lateral edge 36, as shown in FIG. 2; however, in some arrangements, the top surface 24 may include flat sections interspersed among the ridges and valleys or other patterns. Each of the ridges 40 and valleys 42 has an axis extending from the first axial end 30 to the second axial end 32. Preferably the ridges and valleys are arranged parallel with each other and to the longitudinal axis 28 of the roof panel 14.

Figure 3:
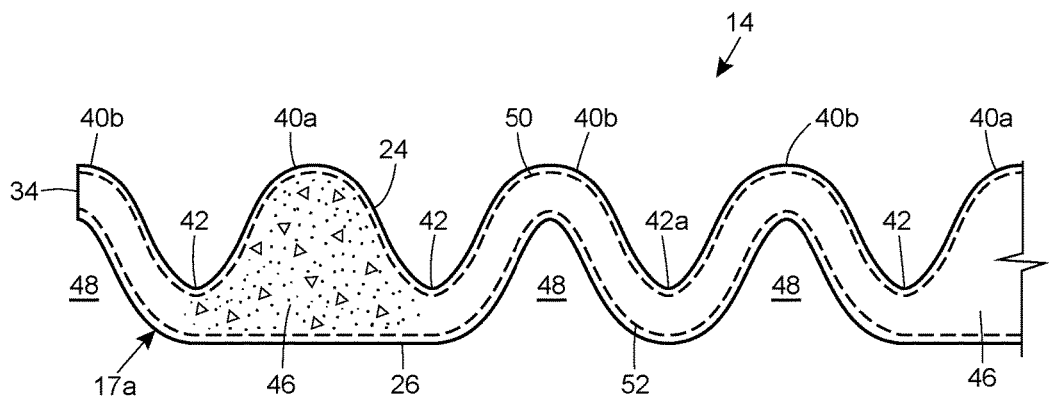
FIG. 3 is an enlarged end view of the roof panel in the detail area marked in FIG. 2 showing details of the cross-sectional profile of the roof panel.

FIGS. 2 and 3 show the top surface 24 undulating in a generally sinusoidal shape in the width direction; however, other undulation shapes, such as box-shaped, semi-circular, arched, polygonal, etc., may also be used. The undulating roof panel can also be referred to as an architectural roof panel since it allows the roof panel to have some architectural or ornamental design aspect. As explained in further detail below, the bottom surface or second surface 26 may be corrugated, such as to match at least some portions of the top surface, un-corrugated, such as being flat or substantially flat, or include a combination of corrugated areas and un-corrugated areas. The bottom surface 26 can also be made flat by adding moisture protection material and/or insulation material to hollow regions 48 shown in FIG. 3.

Reinforcing material having a higher ductility and tensile strength than concrete to provide improved bending strength, as is generally understood in the art, is embedded within the concrete of the panel. According to principles of the present disclosure, in one embodiment, the roof panel 14 includes a first reinforcement layer 50 proximate the top surface 24 and a second reinforcement layer 52 proximate the bottom surface 36.

As best seen in FIG. 3, in one embodiment, the first reinforcement layer 50 is spaced inwardly from the top surface 24 and follows the top surface, such as by being generally parallel with the top surface within normal construction placement tolerances. Similarly, the second reinforcement layer 52 is spaced inwardly from the bottom surface 26 and is generally parallel with the bottom surface.

Preferably, the first reinforcement layer 50 is spaced from the second reinforcement layer 52 across substantially the entire width and length of the roof panel 14. In one embodiment, reinforcement layers 50, 52 are formed of a fiber-reinforced polymer (FRP) mesh, such as a carbon FRP mesh or a glass FRP mesh and spaced about 0.25 inch from their respective top or bottom surfaces 24, 26, other depths can be utilized for different applications and/or thickness of the FRP mesh. Other reinforcing materials besides FRP mesh, such as FRP rebar or steel rebar, may additionally or alternatively be incorporated into the first and/or second reinforcement layers 50, 52. Each of the reinforcement layers 50, 52 preferably extends substantially the entire length and width of the roof panel 14, although in some embodiments the reinforcement layers 50, 52 may be found only in certain areas within the roof panel 14. As an illustrative example, in other embodiments, the top or bottom reinforcement layers 50, 52 may be placed along substantially the entire length and width of the roof panel 14, but the other reinforcement layer may not be found at all, or placed selectively along portions of the roof panel, for example, just along portions of the ridges 40.

FRP mesh reinforcement may provide advantages over other types of reinforcement, such as steel mesh, rebars, or simple reinforcement fibers mixed into the concrete that are not formed as a mesh. For example, FRP mesh may avoid problems with corrosion experienced with steel mesh and rebars while providing more aggregate structural tensile strength over the use of fiber reinforcement that is simply mixed in uniformly in the concrete. FRP mesh also may provide more strength with less space and provide for easier forming in concrete molds, thereby allowing the overall thickness of the roof panel 14 to be minimized.

The roof panel 14 includes one or more structural ribs 46 extending longitudinally from the first axial end 30 to the second axial end 32 of the roof panel 14. The structural ribs 46 in some arrangements provide structural integrity for increased bending strength between the axial ends 30 and 32 and/or provide increased shear strength at support points, such as at support points on the wall and support beam in the building 12. In some applications, these structural ribs allow the roof panel 14 not to require the use of support trusses 20 from the wall to ridge line of a building.

In one embodiment, each structural rib 46 is formed by filling in a hollow ridge portion 48 found underneath the ridges 40 and part of the architectural feature of the roof panel. Structural ribs 46 preferably cannot be noticed if one is looking at the top surface 24 of the roof panel (see for example FIG. 2), thereby allowing the roof panel 14 to have added structural strength while maintaining its aesthetic appeal when covering a building, which is often important in residential applications. Adding the structural rib 46 to an architectural feature (hollow ridge area found underneath ridge) of the roof panel 14 allows the roof panel to look aesthetically pleasing when looking, for example, at the top surface of the roof panel, while adding structural strength to the roof panel 14.

Each structural rib 46 is defined by a thicker portion of the roof panel 14 than the adjacent portions of the roof panel. Thus, the roof panel 14 has a first thickness in regions between adjacent ribs 46 and a second thickness at the rib 46 that is larger than the first thickness.

In the arrangement shown in FIG. 3, each structural rib 46 is defined by a portion of the bottom surface 26 that extends generally straight between adjacent valleys 42 across a ridge 40, thereby forming a solid ridge 40a. In contrast, the ridges 40 where there is no structural rib 46 are hollow ridges 40b, in that the bottom surface 26 generally follows the shape of the top surface 24 to form a hollow region 48 opposite the corresponding ridge 40b. The ribs 46 are not limited to the solid ridge form shown. For example, in some arrangements a structural rib 46 does not completely fill the area (hollow region 48) under a particular rib 40a, and in other arrangements, the rib 46 projects outwardly from the area under the rib 40a beyond the surface of the adjacent valleys 42. In still other arrangements, the ribs may have different profiles, such as a rectangular profile, polygonal profile, I-profile, C-profile. In additional arrangements, a rib 46 is located along the bottom surface 26 opposite a valley 42. In yet a further arrangement, a structural rib 46 is disposed on the top surface 24 and aligned longitudinally along the length of the roof panel 14. In a further embodiment, the roof panel 14 includes ribs 46 as described herein disposed along the bottom surface 26 and along some of the valleys on the top surface 24, such as valley 42a.

Figure 4:
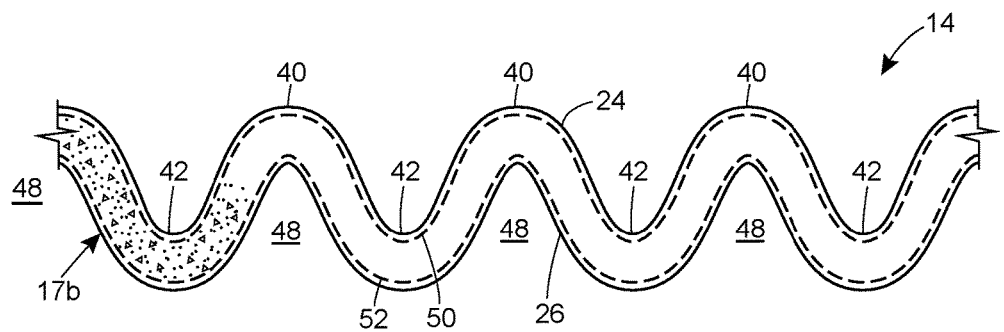
FIGS. 4-5 are detailed end views of cross-sectional profiles similar to FIG. 3 of additional arrangements of the roof panel.
Figure 5:
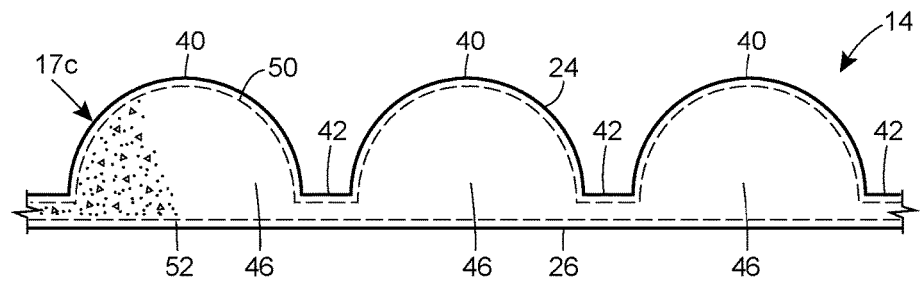

The undulations forming the corrugated form in the top and/or bottom surfaces 24, 26 may be in the shape of the sinusoidal-type surface depicted in FIGS. 2-4 and 6, semi-circular barrel-type surface as shown in FIG. 5, or other undulating elongated axial shapes, such as polygonal shapes or other curvilinear shapes. In the exemplary arrangement of FIG. 3, the roof panel 14 has a generally sinusoidal, corrugated cross-sectional profile 17a, wherein the profile has alternating ridges 40 and valleys 42, as previously described, with a generally constant thickness, and a plurality of the ribs 46 spaced apart along the width of the roof panel 14. The bottom surface 26 undulates with the top surface 24 between adjacent pairs of ribs 46, and is preferably generally parallel with the top surface, such that the ridges 40 and valleys 42 between adjacent pairs of ribs 46 have a substantially constant thickness, i.e., the dimension between the top surface 24 and the bottom surface 26, between the top surface 24 and the bottom surface 26.

In the arrangement of FIG. 3, the roof panel 14 has two hollow ridges 40b disposed between two adjacent structural ribs 46 or solid ridges 40a, and this pattern is repeated a number of times across the width of the roof panel 14. However, other sequences of ribs and hollow ridges 40b may also be used, some of which are exemplified hereinafter.

In one arrangement, the elongated profile 17 is substantially constant along the length of the roof panel 14 between the first and second axial ends 30, 32, which may facilitate rapid or scalable manufacture by concrete extrusion techniques. However, additional structures may be added to the roof panel 14 and/or certain anomalies, such as cut-outs for mechanical runs or electrical ducts, fasteners, and the like may be located along the panel without substantially altering the overall general profile between the ends 30, 32. Additional structural members, such as transverse cross bracing may also be included along the roof panel 14 within the general principles of the disclosure.

The concrete may be any type of concrete suitable for roofing use and that can provide adequate structural integrity for a given structural design. In one preferred arrangement, the concrete comprises standard high strength or low strength Portland cement combined with one or more aggregates, such as sand, crushed stone, gravel, and/or light weight aggregates, such as Perlite™, synthetic materials, and optionally other admixtures known or future developed in the art for providing various desirable qualities to a particular concrete, such as improved workability, structural strength, etc.

The roof panel 14 may have any dimensions practicable for providing sufficient structural integrity for a given application. It is anticipated that in some instances the roof panel 14 may have an unsupported span of ten feet (304.8 cm) or more from the first end 30 to the second end 32, however the roof panel 14 may be formed much longer than ten feet and have one or more intermediate support locations between the first and second ends 30, 32. The roof panel 14 may have a thickness at least between about 1 inch (2.54 cm) and about 6 inches (15.24 cm) or more depending on the particular application, span, etc. The roof panel 14 may have almost any width and any number of undulations as would be practicable for various construction constraints, such as transportability and hoisting limitations, as well as aesthetic implications. The roof panels 14 may also be dyed in a particular color to make them more appealing, especially in residential applications. It is anticipated that roof panels 14 may have generally a width of between approximately 2 feet (60.96 cm) and 20 feet (609.6 cm), more preferably between about 6 feet (182.88 cm) and seven feet (213.36 cm) with adjacent ridges 40 being spaced at approximately 10 inches (25.4 cm) on center and adjacent ribs 46 being spaced at approximately 40 inches (101.60 cm) on center. However, an almost infinite variety of lengths, widths, and thicknesses could be possible within the principles of the disclosure and the dimensions provided are exemplary only.

Returning to the roof system 10 as shown in FIG. 1, the building 12 may comprise any structure for which a roof system may be useful to protect people or goods from one or more of the various external elements. For example, although the building 12 is depicted as a common residential house, the building may comprise practically any type of building structure, such as a warehouse, high rise building, low rise building, commercial or manufacturing facility, garage, shed, car port, stadium, and the like. In preferred anticipated uses, the roof system 10 is particularly well suited for use in low-rise buildings generally no more than three or four stories tall, although the roof system is not limited to use with low-rise buildings.

In the instant example, the roof system 14 is depicted as a common pitched roof arrangement, such as a standard A-frame arrangement, for ease of reference. However, it will be apparent to one of ordinary skill, that the roof system 10 may be readily adapted for any type of roof wherein a panel spans and is supported by two or more spaced apart supports, such as flat roof systems, sloped roof systems, and the like.

In a preferred arrangement, the roof panels 14 are prefabricated away from the building 12, for example by concrete extrusion or by the use of molds, and transported to the building after being fully formed and secured to the supports with fasteners, such as bolts, rivets, welded together steel plates, and the like. In manufacture, the roof panels can be molded a predefined length and then cut to size based on a particular project, or molded to the exact lengths required for a particular project. The reinforcement layers 50, 52 can be placed and supported inside the mold using support members so that they are correctly spaced from the top and bottom surfaces 24, 26 of the roof panels 14 using known techniques. In other circumstances, the roof panels 14 may be cast in place at the building 12 directly on to the supports or as integral parts of the supports using known or future developed cast-in-place forming techniques, for example to eliminate the joints 23. Joint configurations such as tongue and groove joints, pin joints (such as those used in the apex of three-hinged arch configurations), etc. are to be used for fastening pre-cast panels to the supports or to each other.

Figure 6:
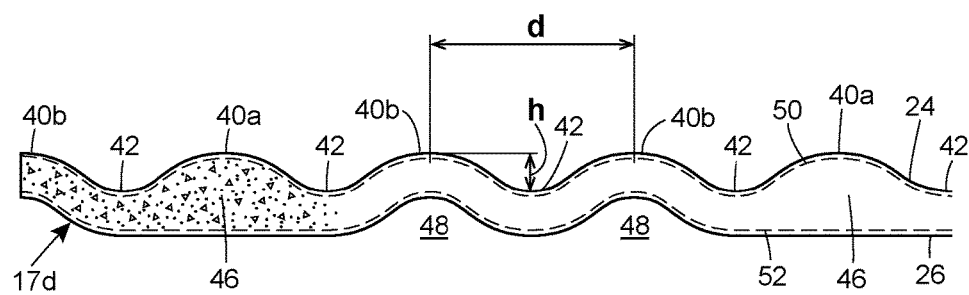
FIG. 6 is an end view of a cross-sectional profile of another exemplary roof panel.

Turning now to FIGS. 4-6, alternative or additional profiles 17b-d for the roof panel 14 are shown as exemplary of just some of many possible variations within the principles of the present disclosure. It is to be understood that the roof panel 14 may include one or more of any of the various profiles 17a-d disclosed herein, either singly or in different combinations, and that the principles of the present disclosure are not limited to the example profiles detailed herein.

FIG. 4 shows a corrugated profile 17b for the roof panel 14 that has no ribs 46. In this arrangement, each of the top and bottom surfaces 24, 26 undulates to form alternating ridges 40 and valleys 42, and hollow regions 48. The undulations of the top surface generally correspond with the undulations of the bottom surface. In one embodiment, the roof panel 14 may have a substantially constant thickness across the entire profile, with the top surface 24 being substantially parallel with the bottom surface 26. In the depicted arrangement, the undulations are generally sinusoidal in shape, but other shapes may also be used as discussed elsewhere. First and second reinforcement layers 50, 52 are disposed along the top and bottom surfaces 24, 26 as previously described herein.

FIG. 5 shows an exemplary profile 17c for the roof panel 14 having a so-called "barrel ridges," in which the top surface 24 includes a plurality of ridges 40 in the shape of arcuate humps and valleys 42 in the shape of flat spaces defined between adjacent ones of the ridges 40. In this arrangement, the bottom surface 26 is substantially flat or planar, whereby each ridge 40 is a solid ridge forming a structural rib 46; however in other arrangements one or more of the ridges 40 may be in the form of a hollow ridge (e.g., hollow ridge 48 in FIG. 3) as described previously or the bottom surface may have a larger radius curvature extending across several ridges 40 and valleys 42, for example. First and second reinforcement layers 50, 52 are disposed along the top and bottom surfaces 24, 26, in this embodiment reinforcement layer 52 is substantially flat paralleling the substantially flat nature of bottom surface 26.

FIG. 6 shows a further exemplary profile 17d for the roof panel 14 that is generally similar to the profile 17a shown in FIG. 3, except that the ridges 40 and valleys are flatter, i.e., the ridge to valley height, h, versus the on-center distance, d, between adjacent ridges and/or valleys is comparatively less, as compared with the form of the profile shown in FIG. 3.

Further, adjacent roof panels 14 may be connected to each other with fasteners along a joint 23. Caulk or a waterproofing membrane may be applied to the roof system 10 to prevent ingress of water along the joint 23. Alternatively, the ends of adjoining roof panels 14 can be designed to provide joint and groove or similar types of connections between the adjacent roof panels 14. The joint 23 may be provided with or sealed with a waterproofing material such as rubber compound to prevent water from penetrating through the joints 23.

FIG. 7 shows a side view of portions of end sections 34, 36 of a first roof panel 704 having a tongue 706 and a second roof panel 702 having a groove 708 used for receiving the tongue 706. The tongue 706 and groove 708 can be angled to work with the pitch of the roof application in question. The two roof panels 702, 704 can be interconnected together using the tongue and groove design in order to provide for a good connection between the roof panels 702, 704. A concrete adhesive and/or water protectant material such as impervious rubber membrane material (e.g., AMES Blue Max™ Liquid Rubber) as known in the art can be added prior to joining the two roof panels 702, 704 together in order to provide for a stronger bond between the two roof panels 702, 704 and water intrusion protection. The two roof panels 702, 704 are shown joined together in FIG. 8. The length of the roof panels 702, 704 can be designed for any required length depending on the building design requirements. In order to provide further strength to the roof panels 702, 704, Glass Fiber Reinforced Polymer (GFRP) rebar 710 are added substantially along the length of the roof panels 710, 712. Although GFRP rebar is preferred given its lighter weight, steel rebar can also be used in alternative applications. The GFRP rebar 710 is introduced in proximity to the first and second reinforcement layers 50, 52. In manufacture, the GFRP rebar 710 can be tied to the reinforcement layers 50, 52 inside the mold using wire or plastic tie wraps to situate them in place prior to pouring the cement/concrete mix into the mold.

Figure 9:
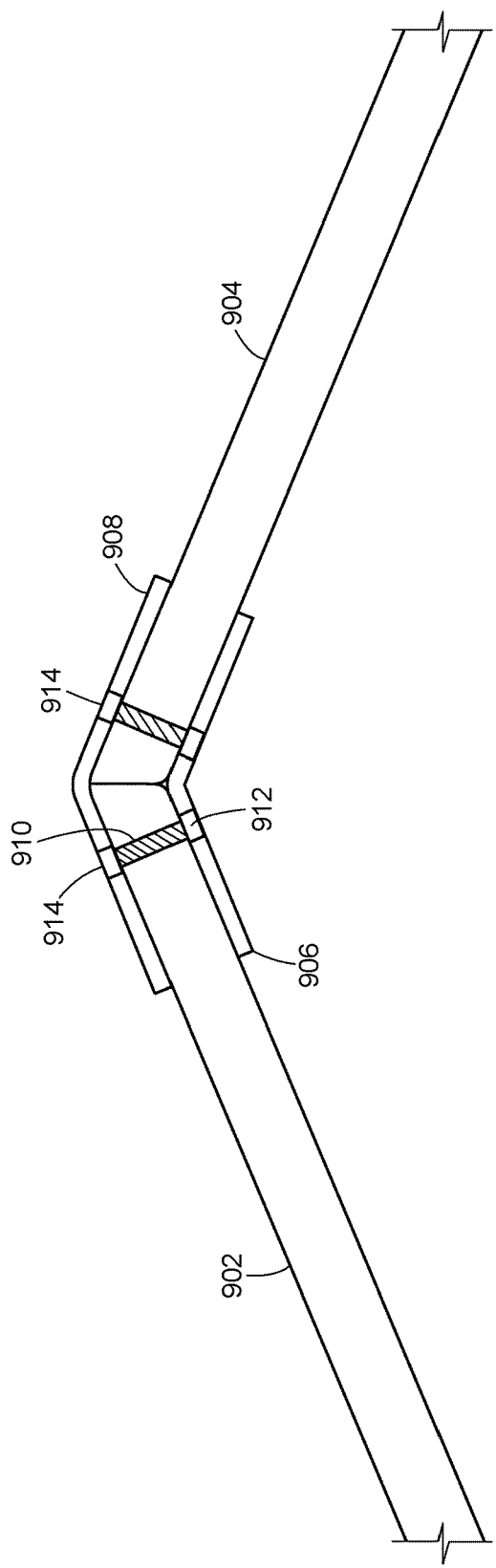
FIG. 9 is a side view of a roof ridge and one embodiment of a roof panel-to-roof panel connection.

Referring now to FIG. 9, one embodiment of a roof ridge roof panel to roof panel connection technique is shown. In this embodiment, roof panel 902 is connected to roof panel 904 at the roof ridge using a bottom ridge component 906 and a top ridge component 908. In one embodiment, the bottom and top ridge components 904, 906 can be made from FRP having an appropriate thickness to support the roof panels 902, 904 and other roof panels along the particular ridge. The top ridge component 908 can have a length that complements the length of the ridge.

During installation, the bottom ridge component 906 is connected to the first roof panel 902 using FRP bolt 910 and nuts 912, 914, alternatively stainless steel bolts/nuts or other fasteners can be used. In order to make the installation of the roof panels easier, the bottom ridge component 906 can be installed to roof panel 902 and the roof panel opposite it along the ridge line, roof panel 904 can then be presented to roof panel 902 and fastened to the same bottom ridge component 906 so that the opposite roof panels can help support each other. A water sealer such as liquid rubber can be placed between the roof panels 902, 904 at the top of the ridge. The top ridge component 906 can then be connected using the upper nuts 914. The upper nuts 914 can then be covered with liquid rubber or other material for water proofing. Other roof panels can then be introduced in similar fashion until the entire roof opening is covered. Although the bottom and top ridge components 904, 906 are shown substantially flat in cross-section, they can be undulated to match the shape along the ridge line of the roof panels. During or after the connection of the bottom and top ridge components 904, 906, a water sealant material can be added to protect against water intrusion.

Figure 10:
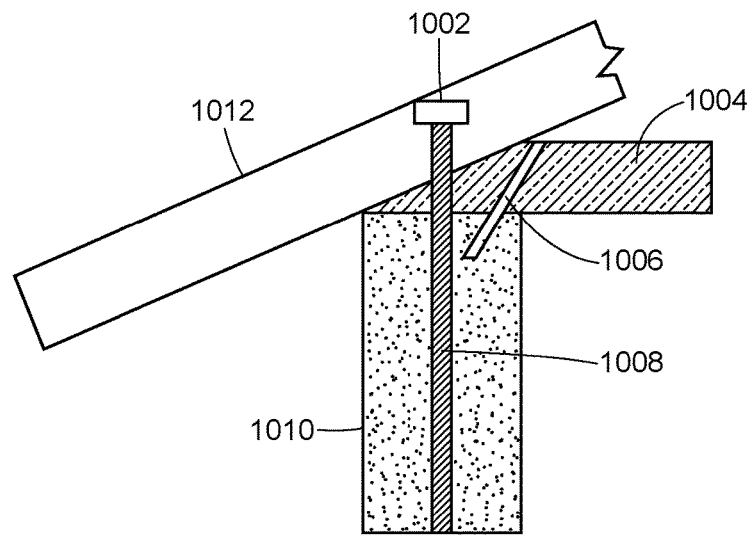
FIG. 10 is a side view of a roof panel-to-building wall connection.

In FIG. 10, there is shown a roof-to-wall connection in accordance with an embodiment of the disclosure. In this embodiment, the roof-to-wall connection includes securing a section of 2×4 inch (or other size, depending on the design) roof wood member 1004 to the masonry block (e.g., CBS block) 1010 using a steel strap 1006 embedded in the masonry block wall 1010 which is nailed or secured in other fashion to the 2×4 roof wood member 1004. The end of the roof wood member 1004 is angled in order to accept the section of roof panel 1012 that will rest on top of it. An FRP rod 1008 embedded into the masonry wall 1010 and having a threaded end section is used to secure the roof panel 1012 to the wall 1010, using an FRP nut 1002. In construction, the FRP rod 1008 and steel strap 1006 are embedded in the top masonry block and concrete is added to the wall 1010 to secure the rod 1008 and strap 1006. The FRP rod 1008 connects through an aperture found in the roof panel 1012. The number of FRP rods needed per roof panel will depend on the particular width and size of the roof panel, pitch of roof, etc.

Figure 11:
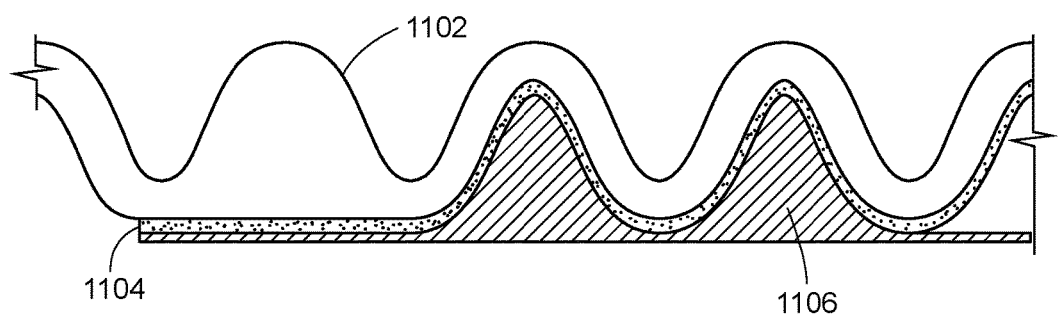
FIG. 11 is a side cross-sectional view of another exemplary roof panel.

Referring now to FIG. 11, a side cross-sectional view of a roof panel 1102 is illustrated. The roof panel 1102 includes a water proofing barrier 1104 and an insulation barrier 1106 added to the roof panel 1102. The water proofing barrier 1104 is preferably disposed on a bottom surface of the roof panel 1102. The insulation barrier 1106 is preferably disposed on a bottom side of the water proofing barrier 1104. The water proofing barrier 1104 and insulation barrier 1106 are added by, for example, spraying or using other well-known depositing techniques onto the roof panel 1102 at the bottom surface. In this example, the bottom surface of the insulation layer 1106 is shown substantially flat once the insulation barrier 1106 and water proofing barrier 1104 are applied. The water proofing barrier 1104 can be formed of impervious rubber membrane (e.g., liquid rubber material) that can adhere to the roof panel 1102 and can be either introduced into the mold during production of the roof panel or applied after the roof panel comes out of the mold. The insulation barrier 1106 can be formed of any one of a number of known insulation material that can be applied to the roof panel 1102 (e.g., by pouring into mold, spray-on, etc.). As illustrated in FIG. 11, the roof panel 1102 provides a simple method of providing high-wind resistance roofing that also provides water and sound protection in one roof panel.

The disclosed roof system may in many instances provide one or more benefits over currently available roofing systems. For example, the roof system can be designed to meet minimum requirements in building codes in hurricane-prone regions, such as the Miami-Dade County Building Code, for example, and has a high structural integrity as compared to common wood roof systems. The roof system may provide sufficient ductility to prevent or substantially reduce the risk of sudden catastrophic collapse. Use of FRP reinforcing structure in lieu of or in addition to conventional steel reinforcement reduces or eliminates degradation of ductility strength caused by corrosion. The roof system is readily adaptable to have higher fire resistance than common wood roof systems using wood trusses and plywood sheathing. The roof system can be pre-fabricated or cast-in-place depending on the requirements of a particular construction project.

Figure 12:
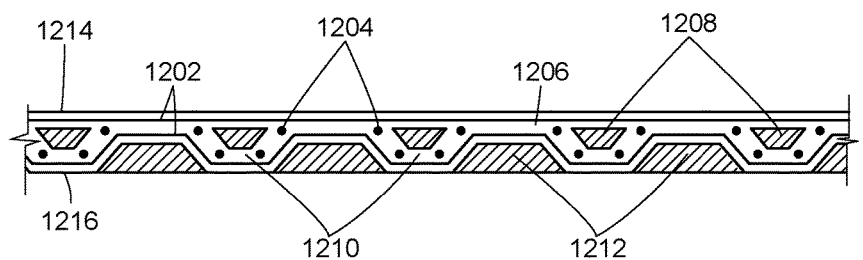
FIG. 12 is a cross-sectional side view of one embodiment of a concrete structure.

FIG. 12 illustrates an exemplary profile of another embodiment that has a first or outer surface 1214 that is substantially flat and a second or interior surface 1216 that is substantially flat after insulation 1212 is added to concrete structure 1206. This embodiment can be useful in applications such as building structures for commercial and industrial buildings that use either flat or sloped roofs designs or a combination, as well as for wall panels for forming the walls of a building. Foam blocks 1208, and FRP or regular steel rebar 1204 may be located within the concrete structure 1206 and run along the length of the structure. The length and width of the structure can vary based on the application being designed for. FRP mesh 1202 runs along the width and length of the structure in proximity to the outer surface 1214 and the interior surface 1216. The FRP mesh 1202 may be embedded within the concrete structure 1206 at a predetermined depth from the outer and inner surfaces 1214, 1216 and may cover most of the surface areas of these surfaces, similar to some of the embodiments previously discussed. In another embodiment, the depth of the FRP mesh can vary from the surface of the structure in some sections depending on particular design requirements. In other embodiments, only one mesh may be located in proximity to either the outer or inner surfaces 1214, 1216, as opposed to being located along both surfaces.

In the embodiment of FIG. 12, the concrete structure has a substantially flat surface on the outer surface 1214 while the interior surface 1216 undulates. Insulation 1212, such as spray-on foam insulation or other types of insulation, may fill the cavities created by the undulating concrete structure of the interior surface 1216. The foam blocks 1208 and the insulation 1212 provide a concrete panel that is strong and highly insulating. Although not illustrated in FIG. 12, in an alternative embodiment, the panel may further include electrical/water lines which may for example be embedded within the insulation 1212 found along the inner surface 1216 of the structure.

The concrete used to form the structure may be, for example, a light weight concrete in order to keep the weight of the overall structure down. The panels may have interlocking ends allowing them to be interconnected as previously discussed in association with FIG. 7. If used for a roof application the panels may be connected as illustrated in FIG. 9, or the panels may be connected in a flat (horizontal) condition, thereby creating a flat roof interconnected to walls of the building similar to the earlier discussion related to FIG. 10, except the panels may be substantially horizontal on top of the walls. If panels are interconnected, a waterproofing barrier can be applied between the interconnections to keep water from seeping between the panels. In some applications, a whole wall or roof may be formed as one integral member that is cast on site using known cast-in-place techniques. If used in a roofing application, the outer surface 1214 may further include a roof membrane (not shown).

Figure 13:
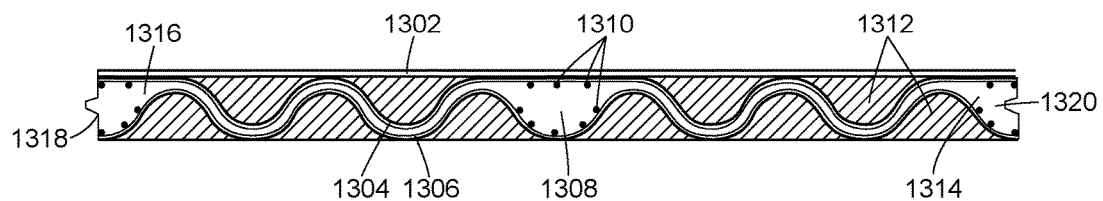
FIG. 13 is a cross-sectional side view of another embodiment of a concrete structure.

Referring now to FIG. 13, another embodiment of a concrete member 1314 is illustrated that is made preferably of lightweight concrete 1316. FIG. 13 illustrates a side view along the width of the structure. The width, length and height of the structure may vary based on design requirements such as span and strength requirements, etc. The concrete member 1314 may be similar to those previously described in relation to FIG. 3-12. The ends of the panel illustrated in FIG. 13 may include one end section 1318 having a tongue and the other end section 1320 having a groove so that other panels may be interconnected together, although other types of interconnection techniques may be utilized. In FIG. 13, two panels are interconnected with the center area formed by the interconnection of the two panels forming an embedded beam 1308 that includes preferably FRP rebar 1310, although steel rebar may be utilized for some applications. FRP mesh 1304 and 1306 may be embedded in proximity to the top and bottom surfaces of the concrete member 1314 and may cover most of the area along the length and width of the structure at a predetermined depth from the outer and inner surfaces. Insulation 1312 may be located on both sides of the structure providing improved insulation capability for the structure. The insulation may be molded into or sprayed onto the structure, or added using other well-known techniques. On the outer (top) surface of the structure, an optional membrane 1302 may be added. The membrane in one embodiment may be a standard roof membrane, while in another embodiment membrane 1302 may comprise a photovoltaic membrane that forms a solar panel that can collect solar energy.

Figure 14:
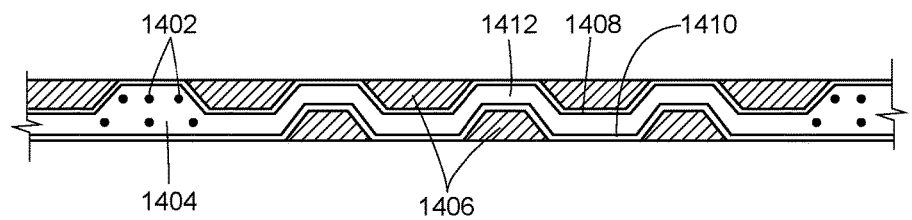
FIG. 14 is a cross-sectional side view of yet another embodiment of a concrete structure.

FIG. 14 illustrates a profile of another embodiment that may include embedded beam portions 1404 that have FRP rebar 1402 along the length of the structure for added reinforcement so that the structure can span a longer length and can be stronger than panels without FRP rebar. Optional insulation 1406 may be included in this embodiment for added insulation capability of the structure. Similar to some of the other embodiments, FRP mesh 1408, 1410 may be located in proximity to the upper and lower surfaces of the light weight concrete shell 1412 in order to reinforce the concrete shell using very lightweight material.

The estimated cost of the structures discussed is comparable to the cost of conventional roofing and wall systems, and may include prefabricated or cast-in-place panels with various shapes and configurations addressing the architectural and structural requirements for a particular design. Tests have found that the disclosed structures can withstand winds up to 200 mph, as opposed to traditional multiple layer roof systems (i.e., metal roofs) that delaminate and break apart under extreme wind conditions. In areas of the United States where high wind events such as hurricanes occur, the disclosed structures minimize the negative effects caused by such events.

The disclosed structures provide high structural integrity at low cost. As previously mentioned, in some designs the structures can support pre-installed wiring and utility connections. Additionally, some designs may include pre-attached insulation to accomplish higher energy rating and sound proofing. The disclosed structures have high ductility and provide higher fire rating than existing systems. For areas where corrosion is a concern, if FRP alone of FRP and FRP rebar are used in a design, the corrosion concerns can be reduced or eliminated when compared to using steel reinforcement techniques, thereby reducing maintenance and repair costs. The disclosed structures maintain aesthetic appeal by replicating architectural shapes of roofs such as flat roofs, flat roofs with pavers, flat roofs with the texture of light weight concrete, barrel tile roofs, etc, while providing superior strength. Design features such as metal seam external geometries can also be added to the outer surface of a design to make the external surface appear to look like a metal roof, etc.

According to some general principles of the present disclosure, a roofing system assembled in accordance with the teachings of one or more of the examples disclosed herein may provide corrugated concrete panels reinforced with high-performance fiber-reinforced polymer (FRP) mesh that when assembled are intended to provide improved resistance to wind, water, and/or debris when compared to currently known roofing systems, and preferably at a comparable cost with currently known roof systems. The disclosed structures may eliminate or at least significantly reduce commonly used roof sub-assemblies and components, such as roof trusses, sheathing, underlayment, and separate coverings, such as tiles, shingles, etc. In one preferred arrangement, the roof panels replicate the shape and color of known so-called barrel tiles, i.e., roofing tiles in the shape of a segment of a barrel. In various arrangements, the roofing system may be used for new construction, i.e., construction of a completely new building or structure, and/or for retrofitting a new roof system to an existing structure. According to additional principles of the present disclosure, a roof system as disclosed herein may be formed by forming the roof panel in-situ on first and second supports using a mold, removing the mold once the roof panel has been formed, and securing the roof panel to each of the first and second support members with a plurality of fasteners.

In some aspects, the roof system and roof panels disclosed herein are useful in many different applications, at least one of which includes use as a hurricane resistant roof system in coastal low-rise buildings. The roof systems described herein however are not limited to any particular industrial usage and may be used in any other manners or application as desired.

Numerous modifications to the panel and panel system disclosed herein will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications within the scope of the appended claims are reserved.

We claim:

1. A concrete component, comprising:
a concrete panel having a length, a width, a first surface, and a second surface, said first surface having a surface area, said first surface and said second surface undulating in a sinusoidal shape across the width forming a series of alternating ridges and valleys extending between first and second edges and defining a corrugated surface, a space beneath a ridge in the first surface forming a hollow ridge portion in the second surface, and some, but not all, of the hollow ridge portions in the second surface being filled in, forming a flat portion of the second surface, and each filled in hollow ridge portion forming at least one structural rib on the second surface running the length of the concrete panel; and
at least one layer of fiber reinforced polymer (FRP) mesh embedded within the concrete panel and covering a substantial portion of the surface area of the first surface, the at least one layer of FRP being spaced inwardly from and parallel to the first surface, the at least one layer of FRP extending along the entire length and width of the concrete panel.

2. The concrete component of claim 1, wherein at least of one of the first and second surfaces is partially covered with insulation.

3. The concrete component of claim 1, wherein the concrete panel undulates along the first surface and the second surface is substantially flat.

4. The concrete component of claim 3, wherein insulation is added into the undulations of the first surface.

5. The concrete component of claim 3, wherein a membrane is coupled to the second surface.

6. The concrete component of claim 5, wherein the membrane comprises a photovoltaic membrane.

7. The concrete component of claim 1, wherein the embedded beam includes a foam block running along a substantial portion of the length of the concrete panel.

8. The concrete component of claim 1, wherein the structural rib further includes at least one FRP rebar running along a substantial portion of the length of the concrete panel.

9. The concrete component of claim 1, wherein the FRP mesh comprises at least one of carbon fibers and glass fibers.

10. A roof panel comprising:
a concrete panel having a length, a width, and an elongated profile extending longitudinally from a first end to a second end along the length, the elongated profile including a top surface and a bottom surface extending from a first edge to a second edge, the top surface undulating in a sinusoidal shape across the width including a series of alternating ridges and valleys extending between the first and second edges and defining a corrugated surface and the bottom surface undulating in a sinusoidal shape across the width and defining a corrugated surface, a space beneath a ridge in the top surface forming a hollow ridge portion in the bottom surface; and
some, but not all, of the hollow ridge portions in the bottom surface being filled in, forming a flat portion of the bottom surface, and each filled in hollow ridge portion forming at least one structural rib on the bottom surface running the length of the concrete panel, the at least one structural rib being incorporated into an architectural feature of the concrete panel.

11. The roof panel of claim 10, wherein the at least one structural rib is not visible when the roof panel is viewed from above.

12. The architectural roof panel of claim 10, further comprising an insulating barrier operatively coupled to the bottom surface.

13. The architectural roof panel of claim 10, further comprising a waterproofing barrier operatively coupled to the bottom surface.

14. The roof panel of claim 10, wherein the elongated profile comprises a plurality of structural ribs, each structural rib formed at a ridge.

15. An architectural roof panel for a truss free roof, the architectural roof panel comprising:
a concrete roof panel having a length and a width, a top surface, a bottom surface, the top surface and the bottom surface undulating in a sinusoidal shape across the width, the sinusoidal shape forming a plurality of alternating and aligned elongated ridges and valleys, a space beneath a ridge in the top surface forming a hollow ridge portion in the bottom surface; some, but not all, of the hollow ridge portions in the bottom surface being filled in, forming a flat portion of the bottom surface, and each filled in hollow ridge portion forming at least one structural rib;
a first layer of reinforcement material spaced inwardly from the top surface and inside of the roof panel, the first layer of reinforcement material being oriented parallel to the top surface, the first layer of reinforcement material extending along the entire length and width of the concrete roof panel; and
a second layer of reinforcement material spaced inwardly from the bottom surface and inside of the roof panel, the second layer of reinforcement material being oriented parallel to the bottom surface, the second layer of reinforcement material extending along the entire length and width of the concrete roof panel;
wherein the concrete roof panel provides structural support.

16. The roof panel of claim 10, wherein the structural ribs formed by the filled in valleys on the bottom surface are formed at a regular interval.

17. The roof panel of claim 16, wherein the regular interval is every third valley on the bottom surface.

* * * * *